(12) United States Patent
Gailloux et al.

(10) Patent No.: US 9,589,119 B1
(45) Date of Patent: Mar. 7, 2017

(54) FEEDBACK SEGMENTATION BASED ON SHORT CODES

(75) Inventors: Michael A. Gailloux, Overland Park, KS (US); Kenneth W. Samson, Belton, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1573 days.

(21) Appl. No.: 12/888,950

(22) Filed: Sep. 23, 2010

(51) Int. Cl.
*G06F 21/32* (2013.01)

(52) U.S. Cl.
CPC .................................. *G06F 21/32* (2013.01)

(58) Field of Classification Search
USPC ............................................................. 705/9
See application file for complete search history.

(56) References Cited

U.S. PATENT DOCUMENTS

| | | | |
|---|---|---|---|
| 2003/0131311 A1* | 7/2003 | McNamara | 714/809 |
| 2009/0157754 A1* | 6/2009 | Patron et al. | 707/104.1 |
| 2009/0186606 A1* | 7/2009 | Agarwal et al. | 455/416 |
| 2010/0048235 A1* | 2/2010 | Dai et al. | 455/518 |
| 2011/0035594 A1* | 2/2011 | Fox | 713/170 |

\* cited by examiner

*Primary Examiner* — Thomas L Mansfield, Jr.

(57) ABSTRACT

A method of processing customer feedback is provided. The method comprises, associating a plurality of short codes to a plurality of portable electronic devices, each different short code associated with at least one different feedback value, wherein the short codes comprise a first short code and a second short code, and receiving a plurality of messages from a first sub-set of the portable electronic devices addressed to the first short code. The method further comprises receiving a plurality of message from a second sub-set of portable electronic devices addressed to the second short code. The method further comprises automatically analyzing the messages based on the first short code and the second short code. The method further comprises allocating customer care resources to respond to the messages based on the analysis.

19 Claims, 6 Drawing Sheets

FIG. 7

FEEDBACK SEGMENTATION BASED ON SHORT CODES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telephones are electronic devices used for mobile voice or data communication over networks of specialized base stations known as cell towers or sites. In addition to the standard voice function of a mobile telephone, current mobile phones and other similar portable electronic devices may support additional services including short message service (SMS) for text messaging, electronic mail, and packet switching for access to the Internet. Other services include gaming, Bluetooth™, infrared, camera with video recorder, multimedia messaging services (MMS) for sending and receiving photographs and downloading of video, MPEG-1 Audio Layer 3 (MP3) for audio storage, radio, and global positioning system services. Current mobile telephone and other portable electronic devices connect to cellular networks consisting of switching points and base stations owned by mobile network operators. Mobile phones, personal digital assistants (PDA), and other similar devices also may provide for memorandum and document recording, personal organizer and personal digital assistant functions, and instant messaging services, and may serve as wireless modems for personal computers and as a console to online games.

SUMMARY

In an embodiment, a method of processing customer feedback is disclosed. The method comprises associating a plurality of short codes to a plurality of portable electronic devices, each different short code associated with at least one different feedback value, wherein the short codes comprise a first short code and a second short code, and receiving a plurality of messages from a first sub-set of the portable electronic devices addressed to the first short code. The method further comprises receiving a plurality of messages from a second sub-set of the portable electronic devices addressed to the second short code. The method further comprises automatically analyzing the messages based on the first short code and the second short code. The method further comprises allocating customer care resources to respond to the messages based on the analysis.

In an embodiment, a portable electronic device is disclosed. The device comprises a radio transceiver, a memory, a processor, and an application. The application is stored in the memory and, when executed by the processor, receives a first user feedback input activation. In response to the first input, the application transmits a message containing diagnostic information addressed to a first short code stored in the memory via the radio transceiver.

In an embodiment, a method of processing customer feedback is disclosed. The method comprises associating a plurality of short codes to a plurality of portable electronic devices, each different short code encoding at least one different feedback value, wherein the short codes comprise a first short code that is associated to a first sub-set of the portable electronic devices and wherein the first short code encodes at least one of a model of the first sub-set of the portable electronic devices and a retail outlet where the first sub-set of the portable electronic devices are purchased. The method further comprises receiving a plurality of first messages from the first sub-set of the portable electronic devices addressed to the first short code. The method further comprises breaking the association between the first short code and a first portable electronic device, the first portable electronic device one of the first sub-set of the portable electronic devices. The method further comprises associating a second short code to the first portable electronic device, wherein the second short code encodes at least one of a region associated with the first portable electronic device and a subscriber class of a subscriber account associated with the first portable electronic device. The method further comprises receiving a plurality of second messages from a second sub-set of the portable electronic devices, wherein the second sub-set of the portable electronic devices are associated with the second short code, automatically analyzing the first messages based on the first short code and the second messages based on the second short code, and based on the analysis, allocating customer care resources to respond to the first messages.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

A user feedback system for portable electronic devices is described. In an embodiment, a user may activate a control of the portable electronic device to create and send a feedback message to a communications service provider about the user's experience with the communication service. The control may be a dedicated button, a soft key, a menu selection, an address book entry, or another control on the portable electronic device. The address book entry may be indexed by the name "feedback" or "provide feedback" or some other meaningful name. The feedback message is automatically addressed to a short code that is sent to the service provider, for example a 4-digit, a 5-digit, or 6-digit short code, that is associated with the control. Because the user only selects the designated control and need not interact with or be knowledgeable about the short code that is associated to the feedback input, the user interaction is simplified and the task of providing feedback is made more convenient for the user. By hiding the association of the short code to the feedback input, the short code associated to a specific portable electronic device may be changed as desired by the communications service provider or other entity without troubling or alerting the user. The short code associated with a particular portable electronic device and/or a particular communication service account may be stored in a memory of the portable electronic device. When the control is activated, the short code stored in the memory is accessed, and a message addressed to the short code is transmitted.

In an embodiment, activation of the control may further open a feedback message creation interface on the portable electronic device, for example a text message creation interface, an email creation interface, or some other electronic message creation interface. The feedback message creation interface may allow the user to enter any text desired. Alternatively, the feedback message creation interface may allow the user to select from an enumerated list of text to include in the feedback message. When a control of the feedback message creation interface is activated, for example a "send" soft key or touch pad key, the feedback message may be transmitted to the short code.

As is known to those of skill in the art, a short code is mapped by the communication network to a location or device in the network, for example a customer service text message box, a sales text message box, or other. In an embodiment, the communication service provider may allocate a plurality of short codes for promoting subscribers transmitting feedback to the service provider. The short codes may be provisioned to the portable electronic devices by the service provider differentially to segment between feedback received from different devices based on a retail outlet that sells the device, a geographic region associated with a residence of the subscriber associated with the device, a subscriber class of the subscriber, a type of communication service plan associated with the device, a model identity of the device, a time since initial purchase of the device, and other information.

It is contemplated that this short code feedback system may be used by a communication service provider to quickly analyze the influx of messages to a plurality of feedback message boxes, each message box associated with one of the short codes. For example, the short code feedback system may promote the communication service provider determining that a text messaging service failure is being experienced in the Midwest, that a major electronics outlet is incorrectly initializing devices that they sell, that a specific model of device is experiencing a high number of dropped calls. The short code feedback system may promote determining other aspects of a user experience with the devices. Without such an automated categorization of feedback, it may be difficult for a communication service provider to learn that there is a problem with their service that needs to be addressed promptly. Subscribers may experience continued problems with one or more communication services for a week or more, without the short code feedback system disclosed herein, before the root cause of the problem is identified and addressed.

While the short code feedback system is illustrated and described below in the context of a communications service provider, it is understood that the short code feedback system may be used in a similar manner by other enterprises to obtain user feedback, for example an electronic device manufacturer such as a media player manufacturer. For example, the electronic device manufacturer may support a plurality of message destinations, one message destination for each of a plurality of short codes allocated by the enterprise. Alternatively, the short code feedback system may be employed by a business enterprise, a government organization, or other organization to segment user feedback.

Figure 1:
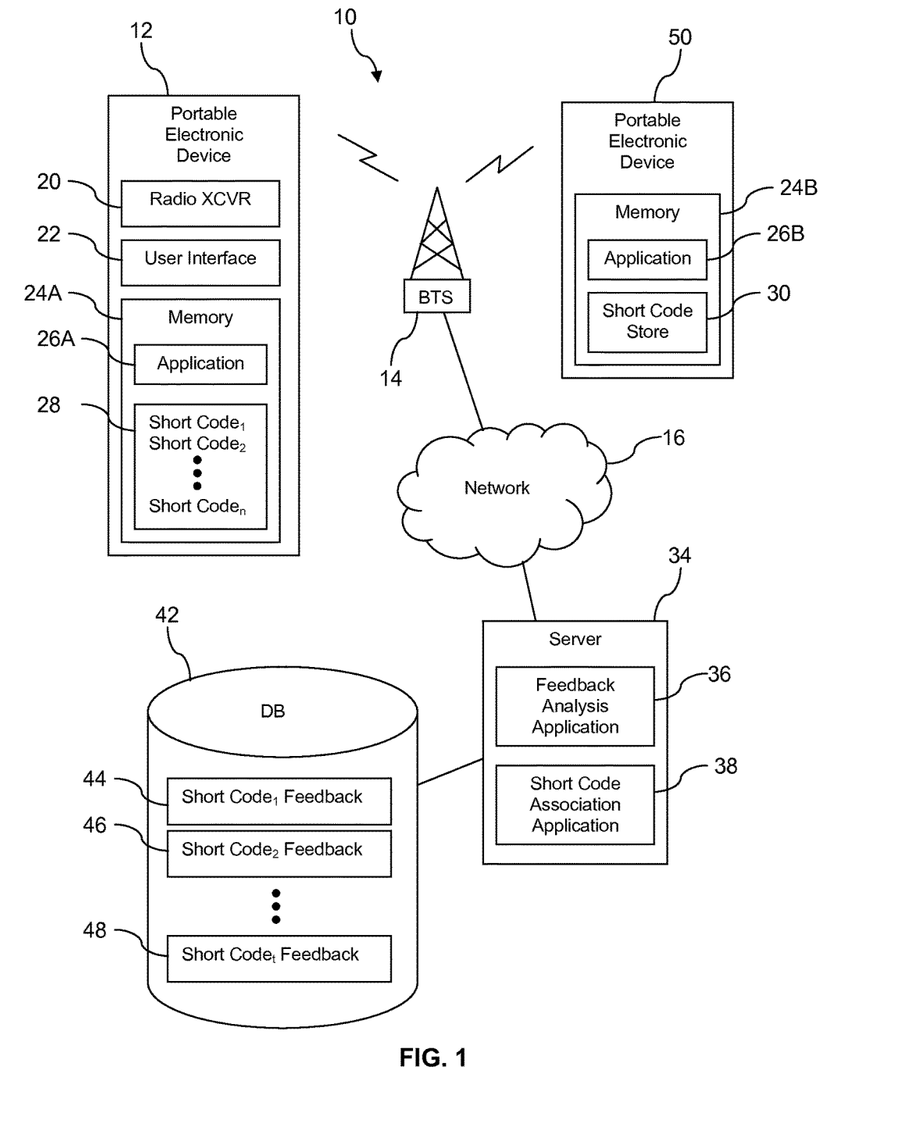
FIG. 1 is an illustration of a communication system according to an embodiment of the disclosure.

Turning now to FIG. 1, a feedback segmentation system 10 is described. The system 10 comprises a portable electronic device 12, a base transceiver station 14, a network 16, a server 34, and a data store 42. The portable electronic device 12 may comprise a radio transceiver 20, a user interface 22, and a first memory 24A. The first memory 24A may comprise a first feedback message application 26A and one or more short codes 28. The base transceiver station 14 provides a wireless communication link to the portable electronic device 12 via the radio transceiver 20 and couples the portable electronic device 12 to the network 16 and there through to the server 34. It is understood that the system 10 may comprise any number of portable electronic devices 12 and any number of base transceiver stations 14. The portable electronic device 12 may be a mobile phone, a personal digital assistant (PDA), a media player, or other electronic device.

In an embodiment, the user interface 22 may comprise an input device and a presentation device. The input device may comprise a key pad, a key board, a touch screen, a microphone, or other input device. The presentation device may be a display screen, a speaker, or other presentation device. The user interface 22 may present a control for transmitting feedback via a short code to the server 34. After the control is activated, the first feedback message application 26A determines a short code to use, and sends a feedback message addressed to the short code. As is known to those skilled in the art, a short code comprises a plurality of digits that are fewer in number than the 10 digit standard telephone number, and the short code may be used to route a text message, a voice call, or other communication message. For example, a text message may be addressed and/or directed to a first short code, and the network 16 and/or a media gateway within the network 16 may translate the short code to an appropriate destination and route the text message to that destination. As another example, a voice call origination message may be addressed to a second short code, and the network 16 and/or a media gateway within the network 16 may translate the short code to the appropriate destination and route the voice call to that destination.

In an embodiment, the first feedback message application 26A may determine the short code for use by reading a short code 28 stored in the first memory 24A. The short code may be provisioned to the first memory 24A at a manufacturing facility, at a distribution facility, or at a retail store. The short code may be provisioned to the first memory 24A during initialization of the portable electronic device 12. The short code may be provisioned to the first memory 24A over-the-air via the base transceiver station 14, for example several weeks after the initialization of the portable electronic device 12, several months after the initialization of the portable electronic device 12, or at any time during the service life of the portable electronic device 12. The short code may be re-provisioned and/or changed one or more times over the service life of the portable electronic device 12. It is understood that different portable electronic devices 12 may have different short codes provisioned. For example, a first portable electronic device 12 sold by a first large consumer products retail outlet may be provisioned with a first short code while a second portable electronic device 12 sold by a second large consumer products retail outlet may be provisioned with a second short code, where the first short code is different from the second short code.

In an embodiment, the first memory 24A may store a plurality of short codes, and the first feedback message application 26A may select a short code from the first memory 24A based on a parameter, for example a time interval since initialization, a geographical location of the portable electronic device 12, an identity of the base transceiver station 14, a visitor location register (VLR) associated with the portable electronic device 12, a residence address associated with a communication service plan associated with the portable electronic device 12, the terms of the service plan, or based on some other parameter associated with the portable electronic device 12. The plurality of short codes may be provisioned to the first memory 24A as described above. The first feedback message application 26A may select a first short code from the first memory 24A during a pre-defined initial period of use, for example about the first two weeks of use, the first month of use, or the first month of use. The first feedback message application 26A may then select a second short code from the first memory 24A after the initial pre-defined period of use. The first feedback message application 26A may select a third short code from the first memory 24A when the portable electronic device 12 is located in a first region and select a fourth short code from the first memory 24A when the portable electronic device 12 is located in a second region.

The feedback message may comprise an empty content portion or may not comprise a content portion. The feedback message may comprise a header portion that identifies the portable electronic device 12 as the originator of the feedback message. The portable electronic device 12 may be identified by a mobile station identity (MSID), a telephone number, or other identifying information. Alternatively, the feedback message may comprise content, for example free text describing a satisfactory user experience with the device 12 and/or describing an unexpectedly useful feature of the portable electronic device 12. For example, the user interface 22 may present a dialog box that receives free text to be entered into the box, possibly with a limitation on the number of characters that may be entered. When a send control in the dialog box is activated, a feedback message addressed to the appropriate short code is created, the content is created in accordance with the text entered, and the feedback message is transmitted to the short code.

Alternatively, the feedback message may comprise text that is pre-determined by a selection menu presented by the user interface 22. For example, the user interface 22 may present a dialog box in response to activation of the control input that displays a fixed list of texts for selection. The list may identify a communication service such as voice service, text messaging, email messaging, web browsing, or other communication service. The list may identify a communication problem such as slow response, no response, or other. The list may offer a combination of these selections. When a message content is selected from the list, a feedback message addressed to the appropriate short code is created, the content is created in accordance with the list selection, and the feedback message is transmitted to the short code. In an embodiment, a content selection displayed in the dialog box may be mapped by the first feedback message application 26A to a brief, obscure code that may not be understandable to a non-technical person, whereby the transmission of the content over the wireless link to the base transceiver station 14 and via the network 16 to the destination designated by the short code consumes less communication bandwidth and/or communication resources. For example, the first feedback message application 26A may map a "SMS Text Problem" display selection to "TX" and a "Voice Call Problem" display selection to "VOIP."

Because content entered pursuant to transmitting feedback may vary in length, the feedback may be transmitted in one message, in two messages, or in more than two messages addressed to the subject short code. The number of messages may be determined by the amount of content to be conveyed. Alternatively, the dialog box may constrain the entry of content so as to limit the number of messages to be transmitted to two messages or to a single message.

The short codes 28 may be used, for example, by a communication service provider, to segment feedback messages according to a variety of parameters. These parameters may comprise a time since initiation of the portable electronic device 12, a length of tenure of a communication service subscription account of the portable electronic device 12, a type of retail outlet where the portable electronic device 12 was purchased, a geographical region, a class of subscriber, a service plan, one or more specific communication services, and other parameters. To assist describing the use of short codes to segment feedback messages, an exemplary association with and/or mapping of short codes to parameters is described with reference to Table 1, Table 2, and Table 3 below. It is understood, however, that other mappings of short codes to parameters are contemplated by the present disclosure.

A communication service provider may allocate a range of short code values for receiving feedback messages, for example 60 different short code values ranging from short code value 27,500 to short code value 27,559. In the tables below, only the right-hand two digits of the short code values are referred to, but it is understood that these may be viewed as either a portion only of the short code value or an offset to an initial short code value.

TABLE 1

Mapping of Short Code Values to Geographical Region.

| Short Code Value Range | Geographical Region |
| --- | --- |
| 0-19 | Eastern Time Zone |
| 20-39 | Central Time Zone |
| 40-59 | West of Central Time Zone |

The short code values 0-19 may be associated with a portable electronic device 12 located in the Eastern Time Zone of the United States; the short code values 20-39 may be associated with a portable electronic device 12 located in the Central Time Zone of the United States; and the short codes 40-59 may be associated with a portable electronic device 12 located in some other time zone west of the central time zone, for example the Mountain Time Zone, the Pacific Time Zone, Alaskan Time Zone, or Hawaiian Time Zone. It is understood that other mappings of short code values to geographical regions are consistent with the present disclosure. In an embodiment, the mapping of short code values may be based in part on a topology of the network 16. In an embodiment, the mapping of the short code values may be based in part on enterprise operating regions. When feedback messages are transmitted by a plurality of portable electronic devices 12 to any of short codes 0-19 (27,500 to 27,019), a communication service provider may quickly determine that these feedback messages are originating from the Eastern Time Zone. If there is a sudden and/or unexpected increase of feedback messages originating from the Eastern Time Zone, this may be used by the communication service provider to allocate personnel to monitor the current operation conditions in the eastern portion of the network 16 more closely, perhaps drilling down to deeper views using a network management system (NMS) tool.

TABLE 2

Mapping of Short Code Values to Retail Outlet and Subscriber Class.

| Short Code Value Range | Retail Outlet | Subscriber Class |
|---|---|---|
| 0-2 | National$_1$ | Premium |
| 3-5 | National$_1$ | Standard |
| 6-8 | National$_2$ | Premium |
| 9-11 | National$_2$ | Standard |
| 12-15 | Local | Premium |
| 16-19 | Local | Standard |

The short code values 0-5 may be associated with portable electronic devices 12 that are sold by a first national retail chain; the short code values 6-11 may be associated with portable electronic devices 12 that are sold by a second national retail chain; the short code values 12-19 may be associated with portable electronic devices 12 that are sold by any of a variety of local retail stores. The short code values 0-2, 6-8, and 12-15 may be associated with portable electronic devices 12 associated with subscribers who are deemed to belong to a premium subscriber class; and the short code values 3-5, 9-11, and 16-19 may be associated with portable electronic devices 12 associated with subscribers who are deemed to belong to a standard subscriber class. Segmentation of subscribers into the premium subscriber class and into the standard subscriber class may be determined according to any of a variety of criteria. A subscriber may be determined to belong to a subscriber class based on one or more of a monthly account value of the subscription, based on a length of subscription tenure, based on a subscriber profile, or based on another criterion or a combination of criteria.

It is understood that the mapping of short code values to retail outlet and subscriber class is compatible with the mapping of short code values to geographical regions. Thus, all of the short code values identified in Table 2 may be associated with portable electronic devices 12 located in the Eastern Time Zone. In combination with the teachings of the present disclosure, mappings of short code values to retail outlet and subscriber class substantially similar to the mappings defined in Table 2 for portable electronic devices 12 located in the Central Time Zone and/or west of the Central Time Zone can readily be defined by those skilled in the art.

If there is an unexpected increase of feedback messages associated with portable electronic devices 12 sold by the first national retail chain, the communication service provider may assign an employee responsible for liaison with the first national retail chain to investigate the feedback further and possibly call a counterpart employee of the first national retail chain to address the feedback. If there is an unexpected increase of feedback messages associated with portable electronic devices 12 used by subscribers belonging to the premium subscriber class, the communication service provider may assign a customer care representative to contact each of those subscribers individually to describe a remediation plan that is being executed in response to their feedback.

TABLE 3

Mapping of Short Code Values to Broadband Data Service.

| Short Code Value Range | Broadband Data Service |
|---|---|
| 0, 3, 6, 9, 12, 16 | Yes |
| 1, 2, 4, 5, 7, 8, 10, 11, 13-15, 17-19 | No |

The short code values 0, 3, 6, 9, 12, and 16 may be associated with portable electronic devices 12 that have a broadband data service provisioned; and the short code values 1, 2, 4, 5, 8, 10, 13-15, and 17-19 may be associated with portable electronic devices 12 that do not have a broadband data service provisioned. It is understood that the mapping of short code values to broadband data service provisioning is compatible with the mapping of short code values to geographical regions, to retail outlet, and to subscriber class as described above with reference to Table 1 and Table 2. The segmentation of short code values based on provisioning of broadband data service or lack of broadband data service to the portable electronic devices 12 may further promote rapid analysis of feedback messages and deploying remediation actions.

It is understood that a wide variety of short code value mappings are possible and contemplated by the present disclosure. While the exemplary mapping above relied upon allocating 60 short code values, in another embodiment a different number of short code values may be allocated. In an embodiment, a first set of short code values may be associated with portable electronic devices 12 during an initial period of use after initialization. After the passage of a pre-determined time interval, the portable electronic devices 12 may be associated with a second set of short code values, for example short code values in a range from 60 to 119 (27,560 to 27619). This kind of segmentation of short code values into a "recently initialized" segment and a "not recently initiated" segment may promote identifying and remedying initial provisioning problems.

In an embodiment, when the portable electronic device 12 transmits a notification message addressed to a short code, the message is routed to a receiver, for example to a mail box (not shown) coupled to the server 34 and stored in the data store 42, for example in a first short code feedback block and/or table. In another embodiment, the notification message addressed to the short code is placed in the first short code feedback block and/or table in a different way. It is understood that different feedback messages addressed to different short codes are stored in different short code feedback blocks in the data store 42. For example, a first feedback message addressed to a first short code may be stored in a first short code feedback table 44, a second feedback message addressed to a second short code may be stored in a second short code feedback table 46, and a third feedback message addressed to a third short code may be stored in a third short code feedback table 48. As a result of the association of short code values to portable electronic devices 12 described above, the feedback messages in the data store are sorted and/or segmented according to parameters associated with the portable electronic devices 12. The feedback messages in the data store 42 may be referred to in some cases as segmented feedback messages or segmented feedback.

In an embodiment, when a feedback message is written to the data store 42, an event trigger is activated and one or more counters may be incremented. For example, referring back to the exemplary short code value associations described above with reference to Table 1, Table 2, and Table 3, when a feedback message addressed to short code 6 is stored in the appropriate short code feedback block, a first event trigger is generated. In response to the first event trigger, a first counter associated with the Eastern Time Zone may be incremented, a second counter associated with the second national retail chain may be incremented, a third counter associated with the premium subscription class may be incremented, a fourth counter associated with the broadband data service may be incremented, and a fifth counter associated with the specific short code 6 may be incremented. When a feedback message addressed to short code 4 is stored in the appropriate short code feedback block, a second event trigger is generated. In response to the second event trigger, the first counter may be incremented, a sixth counter associated with the first national retail chain may be incremented, a seventh counter associated with the standard subscriber class may be incremented, and an eighth counter associated with the specific short code 4 may be incremented. The counters may be periodically copied to a history file, for example a table storing each of the counter values in a row associated with a time of the accumulation interval. The counters may be periodically reset to zero.

The server 34 may be operated by a communication service provider, by a business enterprise, by a government agency, or by another organization. The server 34 may be implemented as a computer system. Computer systems are described hereinafter. The server 34 analyzes the feedback messages based on the short codes to which the feedback messages are addressed and/or analyzes the counters that are incremented in response to event triggers. Based on the analysis, the server 34 automatically assigns and/or recommends tasks to individuals or to roles to respond to the feedback. For example, the server 34 may analyze the segmented feedback in the data store 42 and determine that portable electronic devices 12 in the Midwest are experiencing a high level of problems with broadband data service. Based on this determination, the server 34 may assign an engineer to troubleshoot the problem. The feedback segmentation system 10 may be referred to in some contexts as a backoffice solution, as problems may be addressed by engineers and/or technicians in an office not in direct communication with customers and because the problems may be solved before customers are even aware that a problem exists.

In an embodiment, a feedback analysis application 36 may execute on the server 34. The feedback analysis application 36 may execute periodically to analyze the feedback messages in the data store 42. In an embodiment, a first portion of the feedback analysis application 36 may execute at a first periodic rate to perform a superficial level of problem analysis and a second portion of the feedback analysis application 36 may execute at a second periodic rate to perform a second level of deeper level of problem analysis. The first periodic rate may be a higher frequency than the second periodic rate. In an embodiment, the first portion and the second portion of the feedback analysis application 36 may be implemented as separate software processes. Alternatively, the first portion and the second portion of the feedback analysis application 36 may be implemented as separate threads within the same software process. Those skilled in the art will appreciate that there are other execution architectures that may be employed to implement the first portion and the second portion of the feedback analysis application 36.

In an embodiment, the first portion of the feedback analysis application 36 may consider only a number of feedback messages addressed to a specific short code over a predetermined period of time, for example over a most recent minute. When the number of feedback messages addressed to the specific short code exceeds a predefined threshold, the first portion of the feedback analysis application 36 may assign a trouble ticket to a responsible employee to address the problem. The first portion of the feedback analysis application 36 may consider the values accumulated in the several counters that are incremented in response to trigger events. In an embodiment, by contrast, the second portion of the feedback analysis application 36 may perform a deeper, more time consuming analysis. The feedback analysis also may correlate between counts accumulated in a plurality of counters associated with different short codes. In an embodiment, opening a ticket based on a single counter exceeding a threshold may be delayed until correlating with other selected counters and a ticket may then be opened based on the results of this correlation, possibly resulting in the creation of only one ticket that addresses thresholds being exceeded for a plurality of short codes that may have a single root cause.

The second portion of the feedback analysis application 36 likewise may access feedback messages addressed to the specific short code received over a predetermined period of time, for example over the most recent minute or another period of time, but may further open up each feedback message and read a content portion of the feedback message. The second portion of the feedback analysis application 36 may generate a count of such feedback messages that contain predefined keywords and/or strings of keywords, for example "SMS Text Problem," "Web Access Problem," "Broadband Data Access Problem," "Voice Call Problem," or other keyword identifying a communication service experiencing trouble. The predefined keywords may have been created in the content portion of the feedback messages by the first feedback message application 26A. The predefined keywords may be codes that are brief and possibly obscure to non-technical people, for example "TX," "WB," "BBD," "VOIP," or other. Alternatively, the second portion of the feedback analysis application 36 may read a plurality of the short code feedback message blocks 44, 46, 48 to perform an analysis of a specific parameter, such as problems associated with a first national retail chain. The second portion of the feedback analysis application 36 may analyze the feedback messages and/or the counters based on a historical analysis of feedback messages and/or counters. For example, the second portion of the feedback analysis application 36 may analyze the feedback messages and/or counters based on calculated average values of counters, based on numbers of standard deviations that a counter differs from the average value of the counter. Other types of analysis may be performed by the second portion of the feedback analysis application 36.

While for purposes of description and illustration, only two portions of the feedback analysis application 36 are discussed, the feedback analysis application 36 may be comprised of any number of portions, processes, tasks, or threads. The feedback analysis application 36 further may provide analysis routines or programs that can be invoked at any time by a user, for example an employee of the communication service provider performing a drill down analysis of a suspected communication problem. The feedback analysis application 36 may support a user formulating ad hoc queries to obtain desired information.

A second portable electronic device 50 may comprise a second memory 24B. The second portable electronic device 50 may be a mobile phone, a personal data assistant, a media player, or other electronic device. The second memory 24B may store a second application 26B and a short code store 30. The short code store 30 may store only a single short code value. As the second portable electronic device 50 changes location, for example from a first geographical region to another, the short code store 30 may be changed in accordance with the location of the second portable electronic device 50. A short code association application 38 may execute on the server 34. The short code association application 38 may manage provisioning short code values to the short code store 30 over-the-air or through a different communication path. The short code association application 38 periodically may analyze the parameters associated with the second portable electronic device 50 and, if appropriate, change the short code value stored in the short code store 30 using an over-the-air transaction. The short code association application 38 periodically may also update the short codes 28 stored in the first memory 24A. The short code association application 38 may transmit the short code value and/or short code values to the portable electronic devices 12, 50 as a flash file or other file format. While the second portable electronic device 50 is shown in communication with the base transceiver station 14, it is understood that the second portable electronic device 50 may be in communication with a different base transceiver station.

Figure 2:
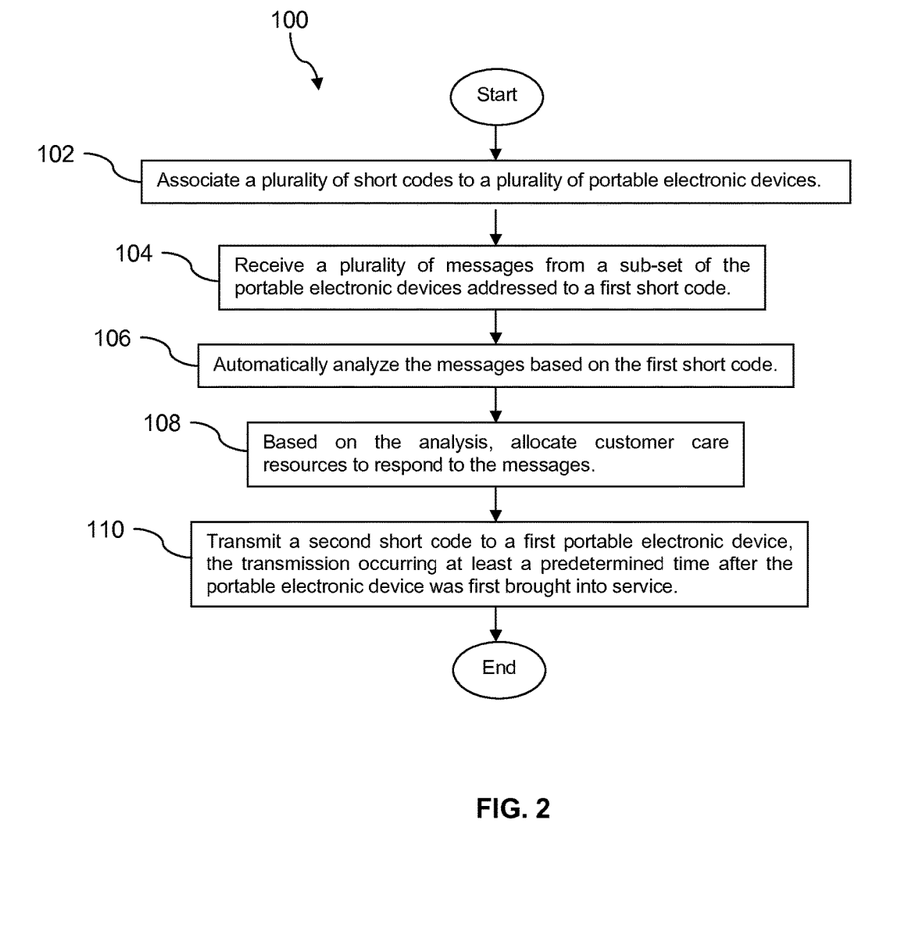
FIG. 2 is a flow chart of a method according to an embodiment of the disclosure.

Turning now to FIG. 2, a method 100 is described. At block 102, a plurality of short code values are associated to a plurality of portable electronic devices 12, 50. At block 104, a plurality of feedback messages are received from a sub-set of the portable electronic devices 12, 50 addressed to a first short code. At block 108, the feedback messages are analyzed based on the first short code. For example, the feedback analysis application 36 and/or one or more portions, processes, threads of the feedback analysis application 36 analyses the feedback messages. It is understood that analysis of the feedback messages may be based, at least in part, on analyzing counters that are incremented in response to trigger events as described further above.

At block 108, based on the analysis, customer care resources are allocated to respond to the feedback messages. For example, a troubleshooting technician is assigned to investigate one or more of the feedback messages in further depth. For example, a team of vendor support staff are held-over for duty to address problems associated with roll-out of a new mode in the network 16 and/or new communication service features. For example, one or more customer care representatives are assigned to call every portable electronic device 12, 50 that sent a feedback message addressed to a specific short code associated with a premium class subscriber account to describe a plan for remedying a communication service problem. For example, an employee is assigned to contact a device original equipment manufacturer (OEM) to identify a high incidence of communication service problems with their newly introduced model. Other responses are also contemplated by the present disclosure. The allocation of customer care resources may be performed automatically, for example by the feedback analysis application 36, and may notify the subject employees, their managers, and/or other stakeholders by electronic mail, automated voice messages, text messages, or other communication path.

At block 110, a second short code is transmitted to one of the portable electronic devices 12, 50 a predetermined time after the device is sold and/or brought into service. The second short code may be determined and transmitted by the short code association application 38. The short code association application 38 may occasionally transmit other short codes to the portable electronic devices 12, 50, for example as a geographical location of the device changes, as a service plan associated with the device changes, as a subscriber class of the communication service subscription account associated with the device changes, and as other parameters associated with the device change.

Figure 3:
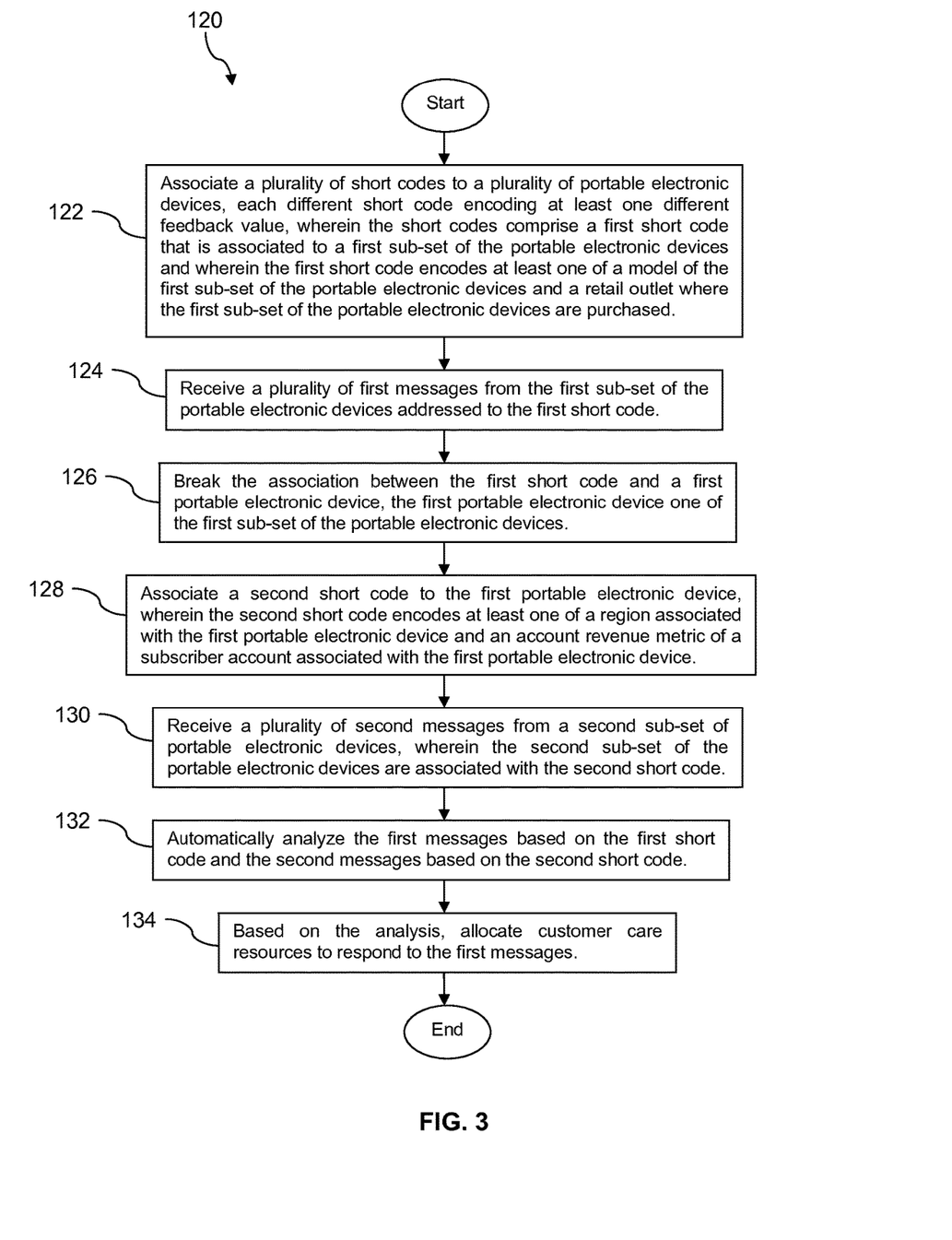
FIG. 3 is a flow chart of a method according to an embodiment of the disclosure.

Turning now to FIG. 3, a method 120 is described. At block 122, a plurality of short codes are associated to a plurality of portable electronic devices 12, 50. Each different short code is associated with or may be mapped to at least one different feedback value and/or parameter value associated with the portable electronic devices 12, 50. The short codes comprise a first short code that is associated to a first sub-set of the devices 12, 50 and the first short code encodes at least one of a model of the first sub-set of devices and a retail outlet where the first sub-set of portable electronic devices 12, 50 are purchased. The short codes further may be associated with other parameters related to the first sub-set of devices 12, 50 as described in further detail above.

At block 124, a plurality of first feedback messages are received from the first sub-set of portable electronic devices 12, 50, each of the first feedback messages addressed to the first short code. At block 126, the association between the first short code and a first portable electronic device, for example portable electronic device 12, is broken. The first portable electronic device is one of the first sub-set of devices. At block 128, a second short code is associated with the first portable electronic device, for example portable electronic device 12. The second short code encodes at least one of a geographical region associated with the portable electronic device 12 and a subscriber class associated to the device. In an embodiment, the blocks 126, 128 may be accomplished in a single step, for example by provisioning a second short code to the portable electronic device 12 over-the-air by the short code association application 38.

At block 130, a plurality of second feedback messages are received from a second sub-set of portable electronic devices, wherein the second sub-set of the portable electronic devices are associated with the second short code. At block 132, the first feedback messages are automatically analyzed based on the first short code. In an embodiment, the second feedback messages are automatically analyzed based on the second short code. At block 134, customer care resources are allocated to respond to the first messages based on the analysis of the first messages.

It is understood that the analysis of the first feedback messages may take place at a different time than the analysis of the second feedback messages. For example, the first feedback messages may be analyzed on a first day, the customer care resources may be allocated and/or assigned to respond to the first messages, the second feedback messages may be analyzed on a second day that is later in sequence than the first day, and based on the analysis of the second feedback messages, customer care resources may be allocated and/or assigned to respond to the second messages. It is understood that analysis of the feedback messages may be based, at least in part, on analyzing counters that are incremented in response to trigger events as described further above.

Figure 4:
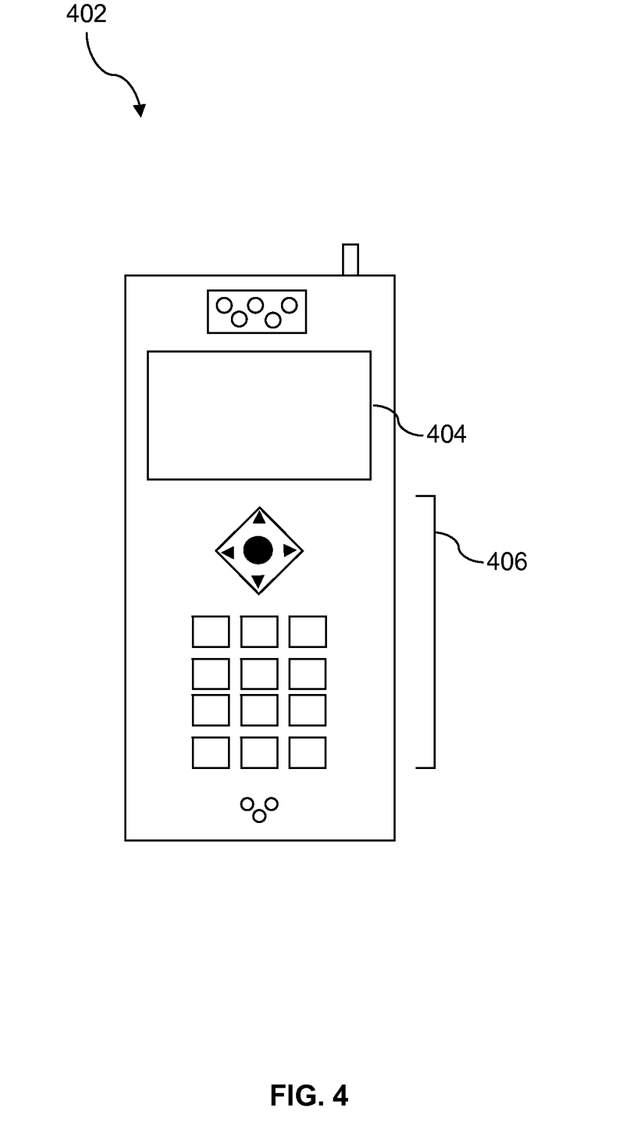
FIG. 4 is an illustration of a handset according to an embodiment of the disclosure.

FIG. 4 depicts an exemplary mobile device 402 that is operable for implementing aspects of the present disclosure, but the present disclosure should not be limited to these implementations. In an embodiment, the portable electronic devices 12, 50 may be implemented in a structure and form substantially similar to that of the mobile device 402. Though illustrated as a mobile phone, the mobile device 402 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 402 is not a general purpose computing device like a portable, laptop or tablet computer, but rather is a special-purpose communications device such as a mobile phone, wireless handset, pager, or PDA. The mobile device 402 may support specialized activities such as gaming, inventory control, job control, and/or task management functions, and so on.

The mobile device 402 includes a display 404 and a touch-sensitive surface and/or keys 406 for input by a user. The mobile device 402 may present options for the user to select, controls for the user to actuate, and/or cursors or other indicators for the user to direct. The mobile device 402 may further accept data entry from the user, including numbers to dial or various parameter values for configuring the operation of the handset. The mobile device 402 may further execute one or more software or firmware applications in response to user commands. These applications may configure the mobile device 402 to perform various customized functions in response to user interaction. Additionally, the mobile device 402 may be programmed and/or configured over-the-air, for example from a wireless base station, a wireless access point, or a peer mobile device 402.

Figure 5:
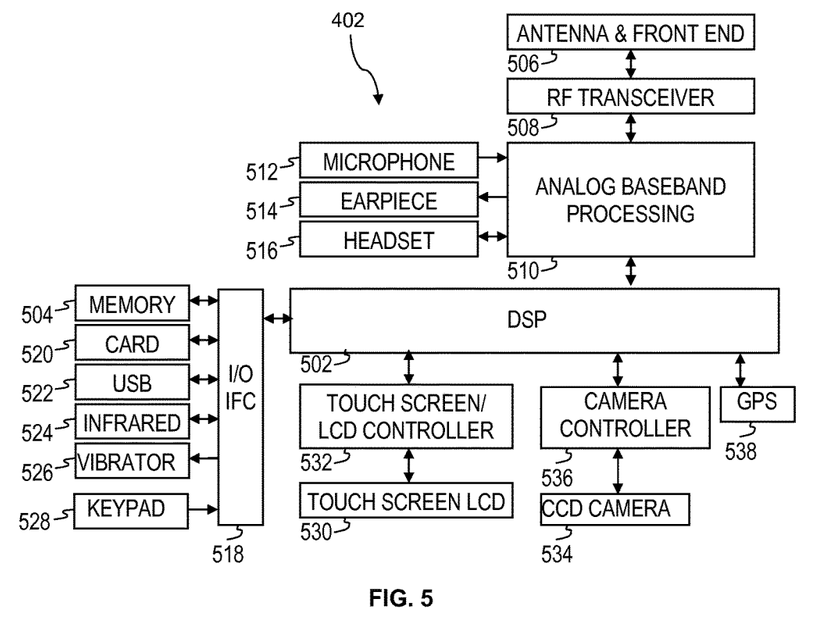
FIG. 5 is a block diagram of a portable electronic device according to an embodiment of the disclosure.

FIG. 5 shows a block diagram of the mobile device 402. While a variety of known components of handsets are depicted, in an embodiment a subset of the listed components and/or additional components not listed may be included in the mobile device 402. The mobile device 402 includes a digital signal processor (DSP) 502 and a memory 504. As shown, the mobile device 402 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 402 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 402 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 402 to send and receive information from a radio access network (RAN) or some other available wireless communications network or from a peer mobile device 402. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 402 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 402 to function as a peripheral device to exchange information with a personal computer or other computer system. The infrared port 524 and other optional ports such as a Bluetooth interface or an IEEE 802.11 compliant wireless interface may enable the mobile device 402 to communicate wirelessly with other nearby handsets and/or wireless base stations.

The input/output interface 518 may further connect the DSP 502 to the vibrator 526 that, when triggered, causes the mobile device 402 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 402. Another input mechanism may be the touch screen LCD 530, which may also display text and/or graphics to the user. The touch screen LCD controller 532 couples the DSP 502 to the touch screen LCD 530.

The CCD camera 534 enables the mobile device 402 to take digital pictures. The DSP 502 communicates with the CCD camera 534 via the camera controller 536. The GPS sensor 538 is coupled to the DSP 502 to decode global positioning system signals, thereby enabling the mobile device 402 to determine its position. In another embodiment, a camera operating according to a technology other than charge coupled device cameras may be employed. Various other peripherals may also be included to provide additional functions, e.g., radio and television reception.

Figure 6:
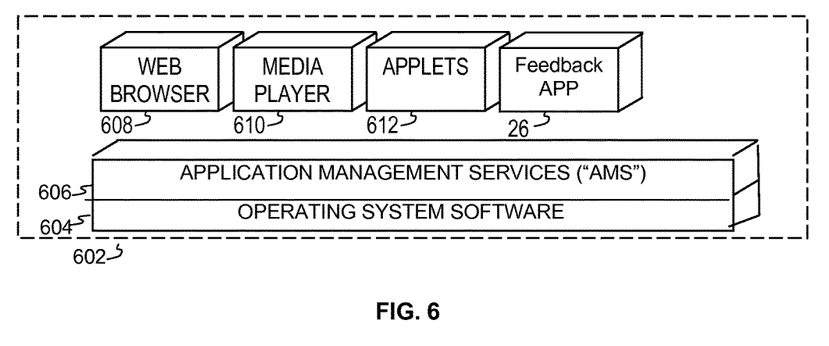
FIG. 6 is a block diagram of a software architecture of a portable electronic device according to an embodiment of the disclosure

FIG. 6 illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services ("AMS") 606 that transfer control between applications running on the mobile device 402. Also shown in FIG. 6 are a web browser application 608, a media player application 610, and JAVA applets 612, and feedback message application 26. The web browser application 608 configures the mobile device 402 to operate as a web browser, allowing a user to enter information into forms and select links to retrieve and view web pages. The media player application 610 configures the mobile device 402 to retrieve and play audio or audiovisual media. The JAVA applets 612 configure the mobile device 402 to provide games, utilities, and other functionality. The feedback message application 26 is discussed above.

Figure 7:
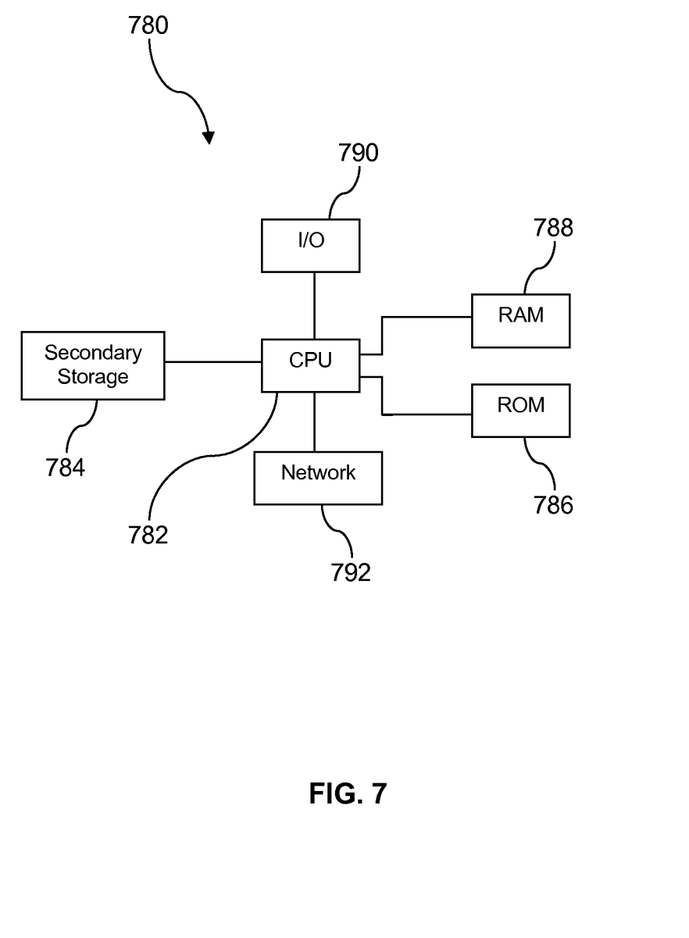
FIG. 7 is a block diagram of a computer system suitable for implementing aspects of embodiments of the disclosure.

FIG. 7 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as non-transitory storage and/or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard drives, floppy disks, optical disks, and/or other device, the ROM 786, and/or the RAM 788 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data in part by directly accessing the computer program product, for example by reading from a CD-ROM disk inserted into a disk drive peripheral of the computer system 780. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of processing customer feedback, comprising:
    provisioning, by a computer processor, a plurality of short codes to a plurality of portable electronic devices according to one or more parameters associated with the plurality of portable electronic devices, each different short code of the plurality of short codes comprising at least one segment associated with the one or more parameters having a value different from the at least one segment of other different short codes of the plurality of short codes, wherein the plurality of short codes comprises a first short code and a second short code;
    receiving, by the computer processor, a first plurality of messages from a first sub-set of the plurality of portable electronic devices addressed to the first short code;
    receiving, by the computer processor, a second plurality of messages from a second sub-set of the plurality of portable electronic devices addressed to the second short code;
    segmenting, by the computer processor, the first and second short codes received in the first and second plurality of messages according to the one or more parameters associated with the plurality of portable electronic devices, each segment of the segmented first and second short codes comprising a value associated with one of the one or more parameters;
    automatically analyzing, by the computer processor, the first and second plurality of messages based on a number of occurrences of the value associated with the one of the one or more parameters occurring in the each segment of the segmented first and second short codes; and
    based on the analysis, allocating, by the computer processor, customer care personnel resources to respond to the first and second plurality of messages.

2. The method of claim 1, wherein the one or more parameters comprises one of an identity of a region where the electronic device is principally operated, an identity of a retail outlet value where the electronic device is purchased, an identity of a model of the electronic device, an identity of a communication service plan, and a subscriber account metric.

3. The method of claim 2, wherein the identity of the region is one of an identity of a time zone and an identity of a metropolitan area.

4. The method of claim 2, wherein the subscriber account metric is one of an average monthly account revenue, an average annual account revenue, a length of time of the subscription, and a metric indicating a frequency of providing feedback.

5. The method of claim 1, wherein the short code is from four digits to six digits long.

6. The method of claim 1, wherein analyzing the first and second plurality of messages further comprises comparing a current volume of messages addressed to the first short code to a historic volume of messages addressed to the first short code, comparing a current volume of messages addressed to the second short code to a historic volume of messages addressed to the second short code, and correlating between the respective volumes of messages.

7. The method of claim 1, further comprising transmitting a third short code to a portable electronic device of the first sub-set, the transmission occurring a predetermined period of time after the portable electronic device of the first sub-set is first brought into service.

8. A portable electronic device, comprising:
    a radio transceiver;
    a non-transitory computer-readable medium;
    a computer processor; and
    an application stored in the non-transitory computer-readable medium that, when executed by the computer processor:
        stores one or more short codes provisioned by a service provider according to one or more parameters associated with the portable electronic device, each different short code of the one or more short codes comprising at least one segment associated with the one or more parameters having a value different from the at least one segment of other different short codes of the one or more short codes, wherein the one or more short codes comprise a first short code;
        receives a first user feedback input activation; and
        in response to the first user feedback input activation, captures diagnostic information, selects the first short code based on a value of the one or more parameters associated with the portable electronic device and the first user feedback input activation, and transmits a first message containing the diagnostic information addressed to the first short code via the radio transceiver.

9. The device of claim 8, wherein the application, when executed by the computer processor, further receives a second short code via the radio transceiver, stores the second short code, receives a second user feedback input activation, in response to the second user feedback input activation, captures diagnostic information, and transmits a second message addressed to the second short code via the radio transceiver.

10. The device of claim 8, wherein in response to the first user feedback input activation the application, when executed by the computer processor, transmits a third message containing feedback information, wherein the feedback information is input after receiving the first user feedback input activation and before transmitting the first message.

11. The device of claim 8, wherein the one or more short codes are stored in a file that is stored in a flash memory portion of the non-transitory computer-readable medium, the one or more short codes further comprising a second short code, wherein during a first time interval the application, when executed by the computer processor, maps the first user feedback input activation to the first short code and during a second time interval the application, when executed by the computer processor, maps the first user feedback input activation to the second short code, and in response to a second user feedback input activation received during the second time interval, transmits a second message addressed to the second short code via the radio transmitter.

12. The device of claim 8, wherein the portable electronic device is one of a mobile phone, a personal digital assistant (PDA), and a media player.

13. The device of claim 8, wherein the first message comprises one of a short message system (SMS) message and a media message system (MMS) message.

14. The device of claim 13, wherein the application, when executed by the computer processor, presents an input menu in response to receiving the first user feedback input activation, the input menu comprising one of a list of SMS messages and a list of MMS messages, and wherein the first message comprises a message selected from the input menu.

15. A method of processing customer feedback, comprising:
provisioning, by a computer processor, a plurality of short codes to a plurality of portable electronic devices according to one or more parameters associated with the plurality of portable electronic devices, each different short code of the plurality of short codes comprising at least one segment associated with the one or more parameters encoding a value different from the at least one segment of other different short codes of the plurality of short codes, wherein the plurality of short codes comprises a first short code that is provisioned to a first sub-set of the plurality of portable electronic devices, and wherein the first short code encodes a value for at least one of a parameter indicating a model of the first sub-set of the portable electronic devices and a parameter indicating a retail outlet where the first sub-set of the portable electronic devices are purchased;
receiving, by the computer processor, a plurality of first messages from the first sub-set of the plurality of portable electronic devices addressed to the first short code;
breaking, by the computer processor, the association between the first short code and a first portable electronic device of the plurality of portable electronic devices;
provisioning, by the computer processor, a second short code of the plurality of short codes to the first portable electronic device of the plurality of portable electronic devices, wherein the second short code encodes a value for at least one of a parameter indicating a region associated with the first portable electronic device and a parameter indicating a subscriber class of a subscriber account associated with the first portable electronic device;
receiving, by the computer processor, a plurality of second messages from a second sub-set of the plurality of portable electronic devices, wherein the second sub-set of the portable electronic devices is provisioned with the second short code;
segmenting, by the computer processor, the first short code received in the plurality of first messages and the second short code received in the plurality of second messages according to the one or more parameters associated with the plurality of portable electronic devices, each segment of the segmented first and second short codes encoding a value associated with one of the one or more parameters;
automatically analyzing, by the computer processor, a number of occurrences of the encoded value of the one of the one or more parameters, occurring in the each segment of the segmented first and second short codes; and
based on the analysis, allocating, by the computer processor, customer care personnel resources to respond to the plurality of first messages and the plurality of second messages.

16. The method of claim 15, wherein allocating customer care personnel resources comprises assigning a personnel resource to further investigate one of: the plurality of first messages and the first short code or the plurality of second messages and the second short code.

17. The method of claim 15, wherein allocating customer care resources comprises assigning a technician to troubleshoot a network service based on one of the first short code and the second short code.

18. The method of claim 15, wherein the one or more parameters identify one of a region of primary operation of the portable electronic device, a retail outlet where the portable electronic device was purchased, a service plan associated with the portable electronic device, and a subscriber account level.

19. The method of claim 18, wherein one encoded value of the subscriber account level identifies a high revenue subscriber.

* * * * *